United States Patent
Kobayashi

(10) Patent No.: US 10,071,451 B2
(45) Date of Patent: Sep. 11, 2018

(54) JIG APPARATUS

(71) Applicant: KOBAYASHI MANUFACTURE CO., LTD., Hakusan-shi, Ishikawa (JP)

(72) Inventor: Yasunori Kobayashi, Hakusan (JP)

(73) Assignee: KOBAYASHI MANUFACTURE CO., LTD., Hakusan (JP)

( * ) Notice: Subject to any disclaimer, the term of this patent is extended or adjusted under 35 U.S.C. 154(b) by 15 days.

(21) Appl. No.: 15/113,016

(22) PCT Filed: Jan. 20, 2015

(86) PCT No.: PCT/JP2015/051376
§ 371 (c)(1),
(2) Date: Jul. 20, 2016

(87) PCT Pub. No.: WO2015/108199
PCT Pub. Date: Jul. 23, 2015

(65) Prior Publication Data
US 2017/0001274 A1     Jan. 5, 2017

(30) Foreign Application Priority Data
Jan. 20, 2014   (JP) .................................. 2014-007842

(51) Int. Cl.
*B23Q 3/02* (2006.01)
*B23Q 1/03* (2006.01)
*B23Q 3/06* (2006.01)

(52) U.S. Cl.
CPC ............ *B23Q 1/035* (2013.01); *B23Q 1/032* (2013.01); *B23Q 3/062* (2013.01)

(58) Field of Classification Search
USPC ................... 269/134, 136, 139, 140, 142
See application file for complete search history.

(56) References Cited

U.S. PATENT DOCUMENTS 2,399,824 A     5/1946  Pressman
4,976,484 A  *  12/1990 Nomaru ................ B23Q 1/626
                                                        269/242

(Continued)

FOREIGN PATENT DOCUMENTS

CN    103170859 A    6/2013
JP    H01-92328 U    6/1989

(Continued)

OTHER PUBLICATIONS

Apr. 14, 2015 Written Opinion of the International Searching Authority issued in International Patent Application No. PCT/JP2015/051376.

(Continued)

*Primary Examiner* — Joseph J Hail
*Assistant Examiner* — Shantese McDonald
(74) *Attorney, Agent, or Firm* — Oliff PLC

(57) ABSTRACT

A jig apparatus includes holding members on which an object to be processed is placed, which members are supported so that they are able to move in a vertical direction. The jig apparatus also includes control unit that controls positions in the vertical direction of the holding members. Control unit causes second holding members, which are selected from among holding members around first holding members on which the object is placed, to be moved to a place in the vertical direction, and to cause the first and second holding members to cooperate in holding the object.

7 Claims, 9 Drawing Sheets

(56) References Cited

U.S. PATENT DOCUMENTS

| | | | | |
|---|---|---|---|---|
| 5,551,677 | A | * | 9/1996 | Puettmer ............... B25B 1/2421 |
| | | | | 269/266 |
| 8,944,423 | B2 | * | 2/2015 | Marrinan ............... B23Q 1/035 |
| | | | | 269/21 |
| 2009/0309283 | A1 | | 12/2009 | Blick et al. |
| 2013/0175750 | A1 | * | 7/2013 | Kobayashi ......... B23K 37/0408 |
| | | | | 269/58 |

FOREIGN PATENT DOCUMENTS

| | | |
|---|---|---|
| JP | 2000-343361 A | 12/2000 |
| JP | 2006-297595 A | 11/2006 |
| WO | 2005/061182 A2 | 7/2005 |
| WO | 2008/004264 A2 | 1/2008 |

OTHER PUBLICATIONS

Apr. 14, 2015 International Search Report issued in International Patent Application No. PCT/JP2015/051376.
May 26, 2017 Office Action issued in Chinese Patent Application No. 201580004320.7.
Oct. 17, 2017 Search Report issued in European Patent Application No. 15737645.0.

* cited by examiner

US 10,071,451 B2

JIG APPARATUS

TECHNICAL FIELD

The present invention relates to a technique for holding objects to be processed, having different shapes.

BACKGROUND ART

Known is a technique for holding objects to be processed, having different shapes. For example, Patent Document 1 describes a workpiece loading surface composed of the tips of workpiece support pins energized by coil springs, which surface deforms according to the shape of a workpiece, and maintains the deformed shape by being held by a clamp metal fixture.

PRIOR ART DOCUMENT

Patent Document

Patent Document 1: JP 2006-297595 A1

SUMMARY OF THE INVENTION

Problems to be Solved by the Invention

The workpiece support pins energized by coil springs maintain their fully extended shape until the tips come into contact with a workpiece. The workpiece support pins having the fully extended shape may hinder processing of a side of the workpiece.

It is an object of the present invention to hold objects to be processed, having different shapes, in such a manner as to facilitate processing of the objects.

Means for Solving the Problems

To solve the problem, the present invention provides a jig apparatus comprising: one or more first holding members selected from among plural holding members supported so that the plural holding members are able to move in a vertical direction, an object to be processed being placed on the one or more first holding members; one or more second holding members selected from among the plural holding members, the one or more second holding members holding the object being processed, by receiving a force in a horizontal direction exerted by the object; and a control unit that moves the one or more second holding members in the vertical direction to a position where the one or more second holding members hold the object.

The control unit may comprise: a first mechanism that moves the one or more first holding members in the vertical direction; and a second mechanism that moves the first mechanism in the horizontal direction.

The plural holding members may be arranged two-dimensionally, and the control unit, in response to movement in the vertical direction of one or more holding members belonging to a row, may prevent a holding member belonging to another row from moving in the vertical direction.

The plural holding members may comprise an attach part, a member for holding an upper side of the object being attached to the attach part.

The jig apparatus may further comprise an acquiring unit that acquires information indicative of positions in the vertical direction of the one or more second holding members, the positions corresponding to a shape of the object, and the control unit may move the one or more second holding members based on the information.

The plural holding members may comprise a first member comprising a contact part that comes into contact with the object, and a second member that supports an underside of the first member, and a contact member of the one or more second holding members may be positioned nearer the object in the horizontal direction than a second member of the one or more second holding members.

The contact member of the one or more second holding members may be movable in the horizontal direction.

The contact member of the one or more second holding members may have a rounded shape or may be elastic.

Effects of the Invention

The present invention makes it possible to hold objects to be processed, having different shapes, so that the objects can be easily processed.

DESCRIPTION OF REFERENCE NUMERALS

1 . . . Jig apparatus, 2 . . . Housing, 3 . . . Support member, 4 . . . Horizontal direction rail, 5 . . . Object to be processed, 10 . . . Holding member, 11 . . . Mount part, 12 . . . Horizontal contact part, 13 . . . Moving rail, 14 . . . Attach part, 15 . . . Square member, 110, 120, 130, 140 . . . Holding member group, 20 . . . Upper holding member, 30 . . . Vertical direction rail, 31 . . . Inner rail, 32 . . . Outer rail, 40 . . . Fixing mechanism, 41 . . . First fixing part, 411 . . . Magnet, 412 . . . Hinge, 42 . . . Second fixing part, 421 . . . Connecting part, 422 . . . Pushing part, 423 . . . Driving part, 50 . . . First moving mechanism, 51 . . . Member, 512, 513, 515, 516 . . . Protruding part, 514, 517 . . . Depressed part, 52 . . . Driving part, 60 . . . Second moving mechanism, 70 . . . Instruction unit, 100 . . . Control unit Modes for Implementing the Invention

[1] Embodiment
[1-1] Configuration

Figure 1:
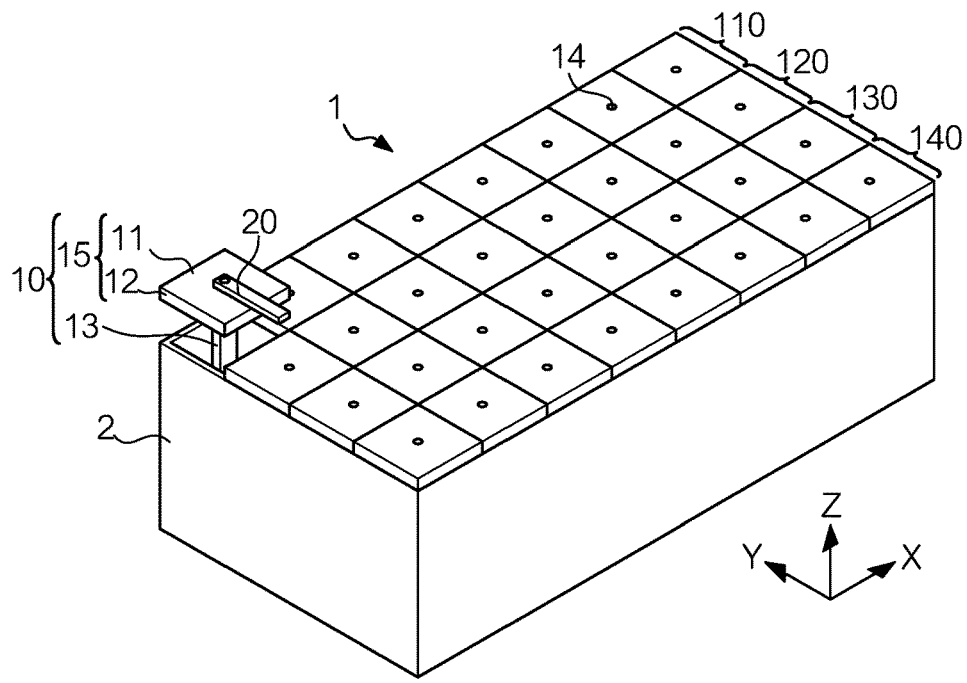
FIG. 1 is a diagram showing an appearance of a jig apparatus.

A configuration of jig apparatus 1 according to an embodiment will be described below with reference to the drawings. In the drawings, three axes, X-axis, Y-axis, and Z-axis, perpendicular to each other indicate directions. A direction pointed by an arrow of each axis is referred to as a positive direction, and the opposite direction is referred to as a negative direction. In the present embodiment, the Z-axis direction may be referred to as a vertical direction, and a direction perpendicular to the Z-axis direction may be referred to as a horizontal direction. In FIG. 1, the three axes are defined so that the X-axis and the Y-axis point the horizontal direction. The positive direction of the Z-axis may be referred to as an upper direction, and the negative direction of the Z-axis may be referred to as a downward direction.

FIG. 1 is a diagram showing an appearance of jig apparatus 1. Jig apparatus 1 is an apparatus for positioning an object to be processed, placed on the apparatus, so that a relative positional relationship between the object and a processing machine is fixed, and for holding the object at the position while being processed. Jig apparatus 1 includes holding members 10 and housing 2 that accommodates the holding members. Holding members 10 are members for holding an object to be processed, which members are supported so that they can move in the vertical direction.

When jig apparatus 1 is used, one or more first holding members and one or more second holding members are selected from holding members 10 depending on the shape of an object to be processed. The selection is made by, for example, a user of jig apparatus 1. The one or more first holding members are holding member(s) 10 on which an object to be processed is placed. The one or more second holding members are holding member(s) 10 that hold an object being processed, by receiving a force in the horizontal direction exerted by the object. The selection of the first holding members and the second holding members from among holding members 10 depends on the shape, size, and position to be placed of an object to be processed.

Each of holding members 10 includes square member 15 and moving rail 13. Square member 15 includes mount part 11 and horizontal contact part 12. Square member 15 is a plate-shaped member, which has a square shape when viewed from above. Mount part 11 is a part of square member 15, facing the upper direction, which part is a flat surface. Mount part 11, when an object to be processed is placed on the part (in other words, when the part is selected as a first holding member), comes into contact with the underside of the object. In the example shown in FIG. 1, square members 15 are tightly arranged parallel to the horizontal plane (the X-Y plane).

A space may exist between adjacent square members 15, which space does not make an object to be processed, placed on the members unstable. Square members 15 are arranged along the X-axis direction and along the Y-axis direction. Namely, square members 15 shown in FIG. 1 are arranged so that they form a grid pattern. Square members 15 include attach part 14 to which upper holding member 20 is attached. Upper holding member 20 is a member for holding the upper side of an object to be processed. Upper holding member 20 comes into contact with the upper side of an object to be processed, placed on jig apparatus 1, and holds the object to prevent it from moving in the upper direction.

Horizontal contact part 12 is a part of square member 15, facing the horizontal direction, which part has a rectangular and flat shape in the present embodiment. Horizontal contact part 12, when selected as a second holding member, can come into contact with an object to be processed, depending on the size of the object. When coming into contact with the object, horizontal contact part 12 comes into contact with a part of the object, facing the horizontal direction. The part of the object will hereinafter be referred to as "horizontal part." After coming into contact with the horizontal part, horizontal contact part 12 holds the object so that the object does not move in the horizontal direction. Moving rail 13 is a long rail, an end in the longitudinal direction of which is connected to the underside of square member 15. Moving rail 13 is a support part that supports the underside of square member 15.

Moving rail 13 is supported by a vertical direction rail (described later) provided inside housing 2 so that the moving rail can move in the vertical direction. A vertical movement of moving rail 13 causes entire holding member 10 to move in the vertical direction. Moving rail 13 has strength enough not to deform under a force in the horizontal direction exerted by an object being processed, and is supported by a force that is strong enough not to cause the moving rail to tilt relative to the vertical direction. Accordingly, holding members 10, when selected as a second holding member, holds an object being processed, by receiving a force in the horizontal direction exerted by the object.

Each of holding members 10 includes a first member (square member 15) that comes into contact with an object to be processed, and a second member (moving rail 13) that supports the underside of the first member, as described above. In the present embodiment, mount part 11 of the first holding member corresponds to a contact part, and horizontal contact part 12 of the second holding member corresponds to a contact part. Entire mount part 11 and entire horizontal contact part 12 may correspond to a contact part, or a portion each of them may correspond to a contact part, depending on the shape of an object to be processed.

Jig apparatus 1 includes holding members 10 arranged two-dimensionally. Specifically, jig apparatus 1 includes holding member groups 110, 120, 130, and 140, each of which includes two or more holding members 10 arranged in a row. In the example shown in FIG. 1, each of the holding member groups includes eight holding members 10 arranged in a row along the X-axis direction. Each of two holding member groups includes two or more holding members 10 arranged along a first holding member group.

Now, a mechanism for moving holding member 10 in the vertical direction will be described.

Figure 2:
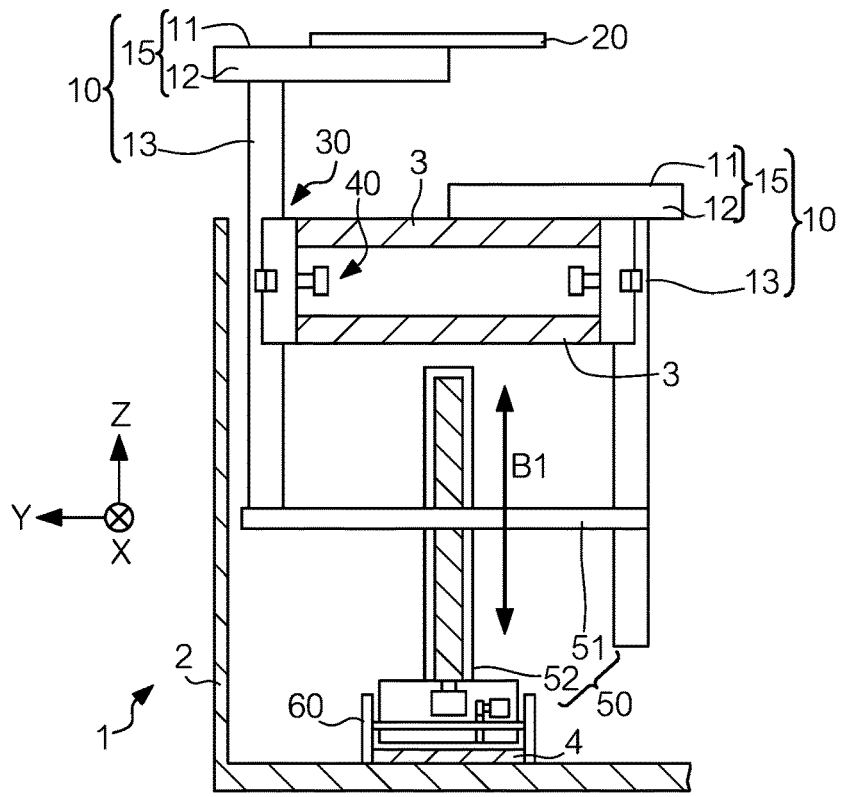
FIG. 2 is a diagram showing an inside of a housing viewed in the positive direction of the X-axis.

FIG. 2 is a diagram showing an inside of housing 2 viewed in the positive direction of the X-axis. Jig apparatus 1 includes, inside housing 2, support member 3, horizontal direction rail 4, vertical direction rail 30, fixing mechanism 40, and control unit 100. FIG. 2 shows a configuration including support member 3, provided at the side of holding member groups 110 and 120. A similar configuration is provided at the side of holding member groups 130 and 140.

Support member 3 includes two plate-shaped members whose longitudinal direction conforms to the X-axis direction. Both the ends in the longitudinal direction of support member 3 are fixed at housing 2. Vertical direction rail 30 is attached to support member 3 at positions corresponding to holding members 10. Vertical direction rail 30 supports moving rail 13 so that the moving rail is able to move in the vertical direction. In other words, vertical direction rail 30 supports holding member 10 so that the holding member is able to move in the vertical direction.

Now, control unit 100 will be described. Control unit 100 controls positions in the vertical direction of holding members so that one or more second holding members vertically move to a position at which an object to be processed is held. The position at which an object to be processed is held, in the present embodiment, refers to a position at which horizontal contact part 12 comes into contact with the object. Control unit 100 includes fixing mechanism 40, first moving mechanism 50, second moving mechanism 60, and instruction unit 70.

Figure 3:
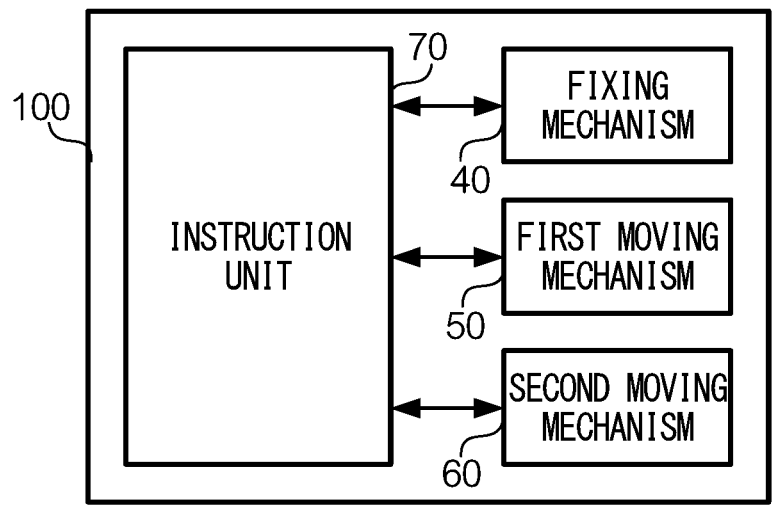
FIG. 3 is a block diagram showing a hardware configuration of a control unit.

FIG. 3 is a block diagram showing a hardware configuration of control unit 100. As shown in the drawing, instruction unit 70 is electrically connected to fixing mechanism 40, first moving mechanism 50, and second moving mechanism 60 so that the instruction unit controls operations of them.

Figure 4:
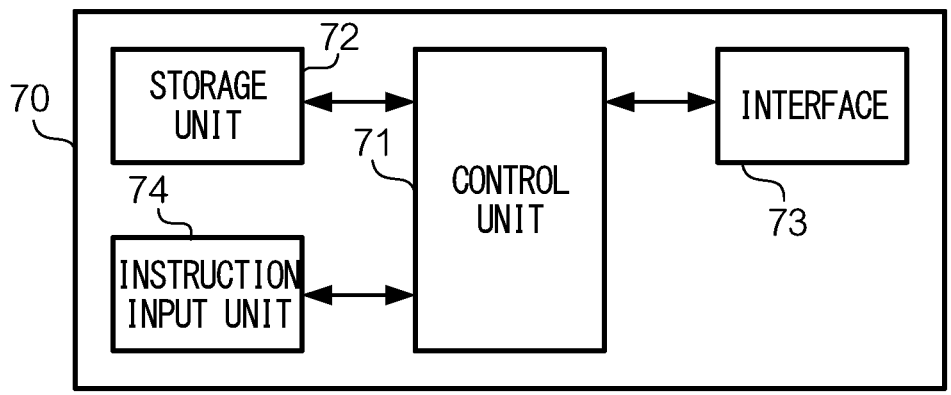
FIG. 4 is a block diagram showing an example of a hardware configuration of a instruction unit.

FIG. 4 is a block diagram showing an example of a hardware configuration of instruction unit 70. Instruction unit 70 includes control unit 71, storage unit 72, interface 73, and instruction input unit 74.

Control unit 71 includes, for example, a CPU (Central Processing Unit), a ROM (Read Only Memory), and a RAM (Random Access Memory). The CPU executes programs stored in the ROM or storage unit 72 to control operations of components, while using the RAM as a work area. Storage unit 72 includes, for example, a hard disk to store data and programs used for control performed by control unit 71. Interface 73 is connected to the moving mechanisms and the fixing mechanism by, for example, a wire so that the interface, under control of control unit 71, provides them with a control signal to instruct them to operate. Instruction input unit 74 includes an operation means used to instruct the moving mechanisms and the fixing mechanism to operate. Instruction input unit 74 provides control unit 71 with operation data indicative of a user's operation. Instruction unit 70, with the configuration described in the foregoing, provides the mechanisms with a control signal to instruct them to operate, according to a user's operation performed relative to instruction input unit 74.

Fixing mechanism 40 fixes a position in the vertical direction of holding member 10. A method for fixing holding member 10 will be specifically described with reference to FIG. 5.

Figure 5:
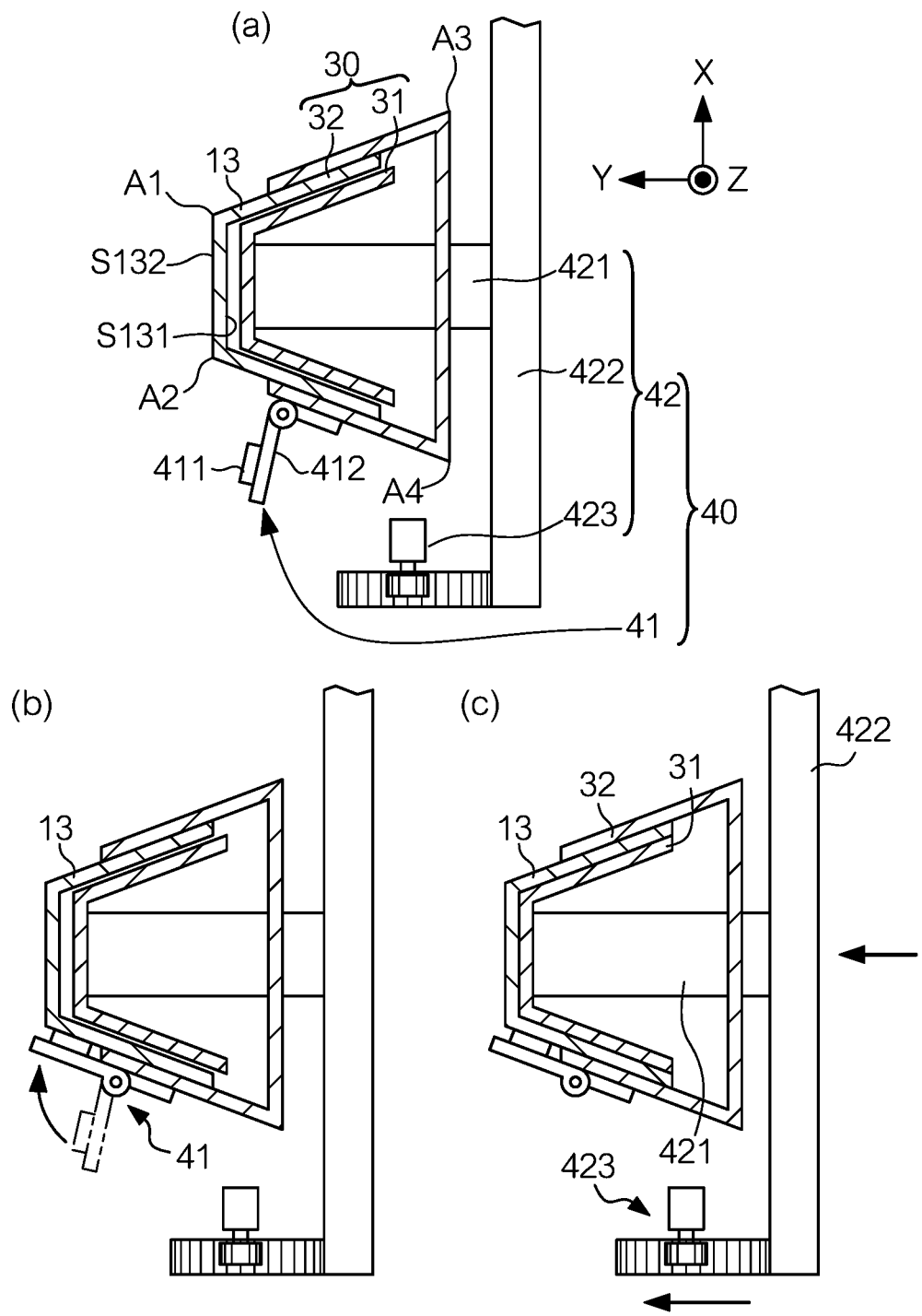
FIG. 5 is a diagram showing a moving rail, a vertical direction rail, and a fixing mechanism, which are viewed from above.

FIG. 5 is a diagram showing moving rail 13, vertical direction rail 30, and fixing mechanism 40, which are viewed from above. FIG. 5 shows moving rail 13 of holding member 10, which is included in holding member group 110 and is positioned at the edge in the negative direction of the X-axis. The holding member corresponds to holding member 10 shown in FIG. 1, which has moved in the upper direction. Moving rail 13 includes a plate-shaped member whose ends in the width direction (in a direction perpendicular to the longitudinal direction) are bent in a direction at two positions A1 and A2 shown in FIG. 5 at an angle less than 90 degrees. Positions A1 and A2 are separated from a nearest edge in the width direction of moving rail 13 by an identical distance. Moving rail 13 has a cross-section shape of an isosceles trapezoid not having the lower base. Moving rail 13 includes inner surface S131 and outer surface S132 opposite to the inner surface.

Vertical direction rail 30 includes inner rail 31 and outer rail 32. Inner rail 31 has the same shape as moving rail 13, and has a size smaller than the moving rail. Inner rail 31 is arranged at the side of inner surface S131 of moving rail 13. Outer rail 32 includes a plate-shaped member whose ends in the width direction are bent in a direction at two positions A3 and A4 shown in FIG. 5 at an angle greater than 90 degrees. Positions A3 and A4 are separated from a nearest edge in the width direction of outer rail 32 by an identical distance. Outer rail 32 has a cross-section shape of an isosceles trapezoid not having the upper base. Outer rail 32 is arranged so that the bent parts of the outer rail face outer surface S132 of moving rail 13. Moving rail 13 is sandwiched between inner rail 31 and outer rail 32. In the example shown in FIG. 5(a), a space exists between moving rail 13 and inner rail 31 and between moving rail 13 and outer rail 32 so that the moving rail is able to easily move in the vertical direction.

Fixing mechanism 40 includes first fixing part 41 and second fixing part 42. First fixing part 41 is a part of fixing mechanism 40, that temporarily fixes a position in the vertical direction of moving rail 13. First fixing part 41 includes magnet 411 and hinge 412. Magnet 411 is attached to a part of hinge 412, and outer rail 32 is attached to the other part of hinge 412. FIG. 5(a) shows closed hinge 412 that detaches magnet 411 from moving rail 13. FIG. 5(b) shows open hinge 412 that causes magnet 411 to stick to moving rail 13. Magnet 411 sticking to moving rail 13 fixes the moving rail to prevent it from moving in the vertical direction. This is how first fixing part 41 temporarily fixes a position in the vertical direction of moving rail 13.

Second fixing part 42 is a part of fixing mechanism 40, that fixes a position in the vertical direction of moving rail 13 during processing. Second fixing part 42 includes connecting part 421, pushing part 422, and driving part 423. Connecting part 421 is a rod-shaped member connected to inner rail 31 through a hole provided at outer rail 32. An end of connecting part 421, which is opposite to the end connected to inner rail 31, is connected to pushing part 422. Pushing part 422 includes an elongated-plate-shaped member, whose longitudinal direction conforms to the X-axis direction. Pushing part 422 is connected to connecting parts 421 connected to inner rails 31 supporting holding members 10 included in holding member group 110.

Driving part 423 is provided at both the ends in the X-axis direction of pushing part 422. Driving part 423 is provided at an end of pushing part 422, not shown in FIG. 5. Driving part 423 includes, for example, a drive unit such as a motor, and a gear so that the driving part moves pushing part 422 in the Y-axis direction. Pushing part 422 moved by driving part 423 toward moving rail 13 (in the positive direction of the Y-axis in FIG. 5) causes inner rail 31 to push moving rail 13 against outer rail 32, as shown in FIG. 5(c). This is how second fixing part 42 fixes a position in the vertical direction of holding member 10 included in holding member group 110.

Second fixing part 42 fixes a position of holding member 10 with a force stronger than that with which first fixing part 41 fixes a position of the holding member. Accordingly, holding member 10 is less likely to move in the vertical direction during processing than when the holding member is temporarily fixed. A similar mechanism applies to holding members 10 included in other holding member groups, which mechanism fixes positions in the vertical direction of the holding members. Pushing part 422, if moved by driving part 423 away from moving rail 13, releases fixture of positions in the vertical direction of holding members 10. Second fixing part 42, with the configuration described in the foregoing, fixes holding member 10, and releases fixture of the holding member. Second fixing part 42 operates in accordance with an instruction from instruction unit 70.

FIG. 2 is referred to again. First moving mechanism 50 moves one or more holding members 10 in the vertical direction. First moving mechanism 50 includes member 51 and driving part 52 for moving member 51 in the vertical direction. Driving part 52 includes, for example, a motor to move driving part 52 to a specified position in the vertical direction. First moving mechanism 50, by moving member 51 in the vertical direction using driving part 52, moves holding member 10 in the vertical direction.

First moving mechanism 50 moves holding member 10 to a position determined by, for example, a user based on the size of an object to be processed. The position will hereinafter be referred to as "vertical position." A vertical position falls within a range of length (for example, from 0 millimeter to a few hundred millimeters) determined by sizes of moving rail 13 and driving part 52. For example, a vertical position represented by a length of 50 millimeters indicates a position of holding member 10 that has been pushed up by 50 millimeters from an initial position. First moving mechanism 50 moves one of holding members 10, which corresponds to a position in the X-axis direction of member 51. A mechanism for moving holding member 10 will be described with reference to FIG. 6.

Figure 6:
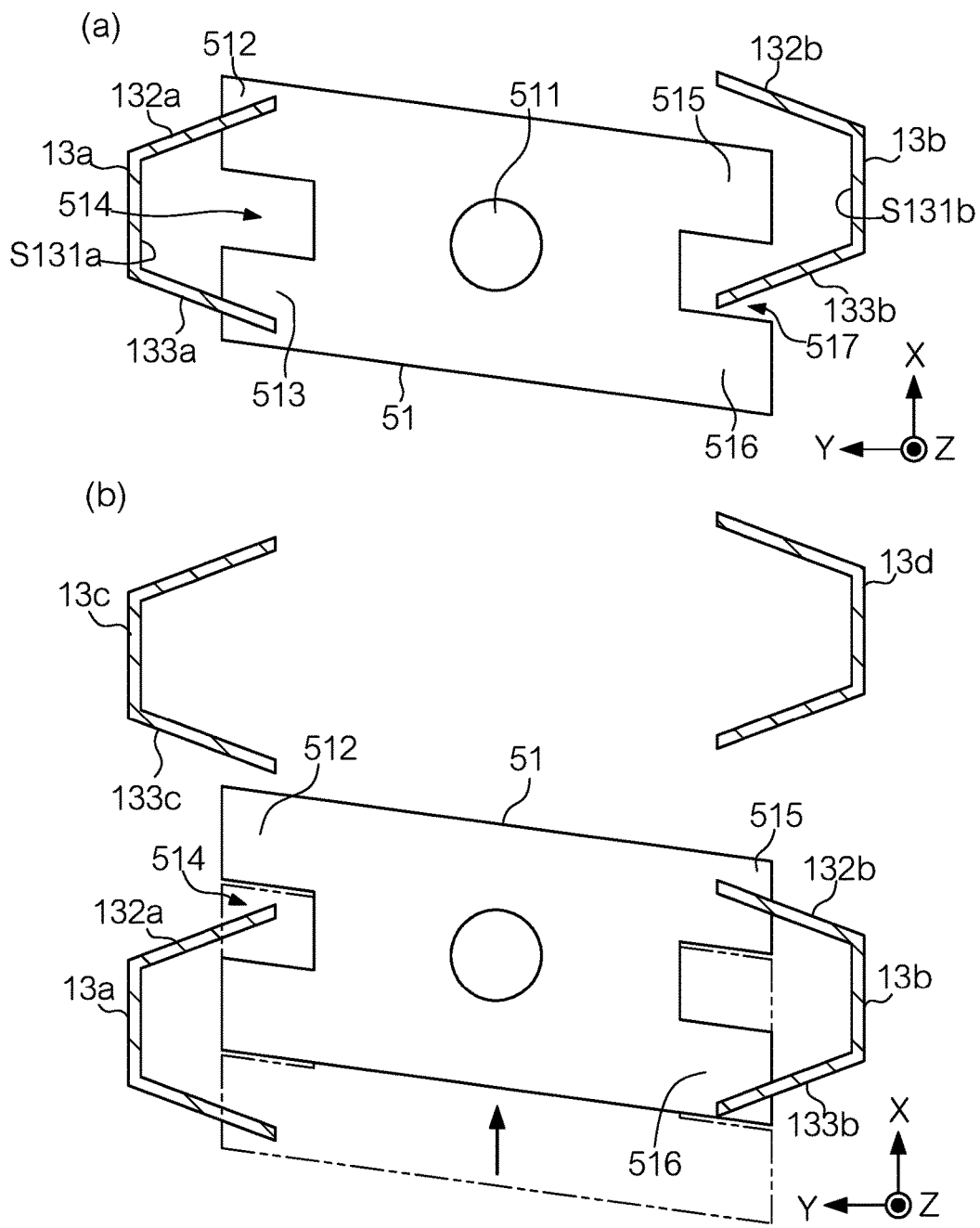
FIG. 6 is a diagram showing a moving rail and a moving member, which are viewed from above.

FIG. 6 is a diagram showing moving rail 13 and member 51, which are viewed from above. FIG. 6 shows moving rail 13 (shown as 13*a*) included in holding member group 110 and moving rail 13 (shown as 13*b*) included in holding member group 120. Moving rails 13 are arranged so that their inner surfaces 5131 (shown as S131*a* and S131*b*) face each other. Member 51 includes attach part 511 at its center, that is attached to driving part 52, which causes member 51 to move in the vertical direction.

Member 51 is a plate-shaped member, which includes two protruding parts 512 and 513 and depressed part 514 sandwiched between the protruding parts, which parts are formed at an end of the member in the positive direction of the Y-axis. Member 51 also includes two protruding parts 515 and 516 and depressed part 517 sandwiched between the protruding parts, which are formed at an end of the member in the negative direction of the Y-axis. The protruding parts are protruding relative to the depressed part, while the depressed part is depressed relative to the protruding parts. Member 51 having the protruding parts and the depressed part is H-shaped (specifically, inclined-H-shaped) when viewed in the Y-axis direction. The longitudinal direction of member 51 is inclined relative to the Y-axis direction.

In the example shown in FIG. 6(*a*), protruding parts 512 and 513 come into contact with bent parts 132*a* and 133*a* (bent part 132*a* is positioned at the positive direction side of the X-axis), which are bent toward inner surface S131*a* of moving rail 13*a*. On the other hand, protruding parts 515 and 516 does not come into contact with bent parts 132*b* and 133*b* (bent part 132*b* is positioned at the positive direction side of the X-axis), which are bent toward inner surface S131*b* of moving rail 13*b*. Bent part 133*b* overlaps depressed part 517. If member 51 positioned as shown in FIG. 6(*a*) moves in the vertical direction in a condition that holding member 10 is free to move in the vertical direction, moving rail 13*a* moves in the vertical direction, while moving rail 13*b* does not move in the vertical direction.

FIG. 6(*b*) shows moving rail 13*c* adjacent to a side in the positive direction of the X-axis of moving rail 13*a*, and moving rail 13*d* adjacent to a side in the positive direction of the X-axis of moving rail 13*b*. Member 51 has moved in the positive direction of the X-axis as compared to the member shown in FIG. 6(*a*) so that protruding part 512 is positioned between bent part 132*a* of moving rail 13*a* and bent part 133*c* of moving rail 13*c*, bent part 132*a* of moving rail 13*a* overlaps depressed part 514, and protruding parts 515 and 516 come into contact with bent parts 132*b* and 133*b* of moving rail 13*b*. If member 51 positioned as shown in FIG. 6(*b*) moves in the vertical direction in a condition that holding member 10 is free to move in the vertical direction, moving rail 13*b* moves in the vertical direction, while moving rails 13*a*, 13*c*, and 13*d* do not move in the vertical direction.

If member 51 is positioned relative to moving rails 13*c* and 13*d* as in the case where member 51 is positioned relative to moving rails 13*a* and 13*b*, shown in FIG. 6(*a*), moving rail 13*c* is able to move, while moving rail 13*d* is not able to move. If member 51 is positioned relative to moving rails 13*c* and 13*d* as in the case where member 51 is positioned relative to moving rails 13*a* and 13*b*, shown in FIG. 6(*b*), moving rail 13*d* is able to move, while moving rail 13*c* is not able to move.

As illustrated in the foregoing, member 51 moves holding member 10 included in a first holding member group (in the example shown in FIG. 6, holding member group 110), while not moving holding member 10 included in a second holding member group (in the same example, holding member group 120). On the other hand, member 51 moves holding member 10 included in the second holding member group, while not moving holding member 10 included in the first holding member group. First moving mechanism 50, using member 51, moves holding member 10 in the vertical direction, corresponding to a position in the X-axis direction of the member. Control unit 100, in response to movement in the vertical direction of one or more holding members 10 belonging to a row (for example, holding member group 110), prevents holding member 10 belonging to another row (for example, holding member group 120) from moving in the vertical direction. Control unit 100 according to the present embodiment restricts an amount of movement of holding member 10 belonging to another row to zero.

Use of member 51 having the shape shown in FIG. 6 enables a user to move holding member 10 in the vertical direction, which is selected from either a first holding member group or a second holding member group, using a single drive mechanism (driving part 52 of jig apparatus 1) that drives holding member 10 in the vertical direction. First moving mechanism 50 performs the operations described in the foregoing according to instructions from instruction unit 70.

FIG. 2 is referred to again. Second moving mechanism 60 moves first moving mechanism 50 in the horizontal direction. Second moving mechanism 60 includes, for example, a motor and wheels to move first moving mechanism 50 to a specified position in the X-axis direction. In the example shown in FIG. 2, second moving mechanism 60 moves to a specified potion in the X-axis direction, together with first moving mechanism 50, with its wheels on plate-shaped horizontal direction rail 4 provided at housing 2, whose longitudinal direction conforms to the X-axis direction. The specified position is a position at which member 51 can come into contact with moving rail 13 as shown in FIG. 6, which position exists for each holding member 10. The position will hereinafter be referred to as "corresponding position." In the example shown in FIG. 1, 16 corresponding positions exist because holding member groups 110 and 120 include 16 holding members 10. Second moving mechanism 60 operates in accordance with instructions from instruction unit 70.

[1-2] Overview

Jig apparatus 1, with the configuration described in the foregoing, holds an object to be processed, by controlling positions in the vertical direction of holding members 10. A procedure of the control will be described with reference to FIGS. 7 to 9.

Figure 7:
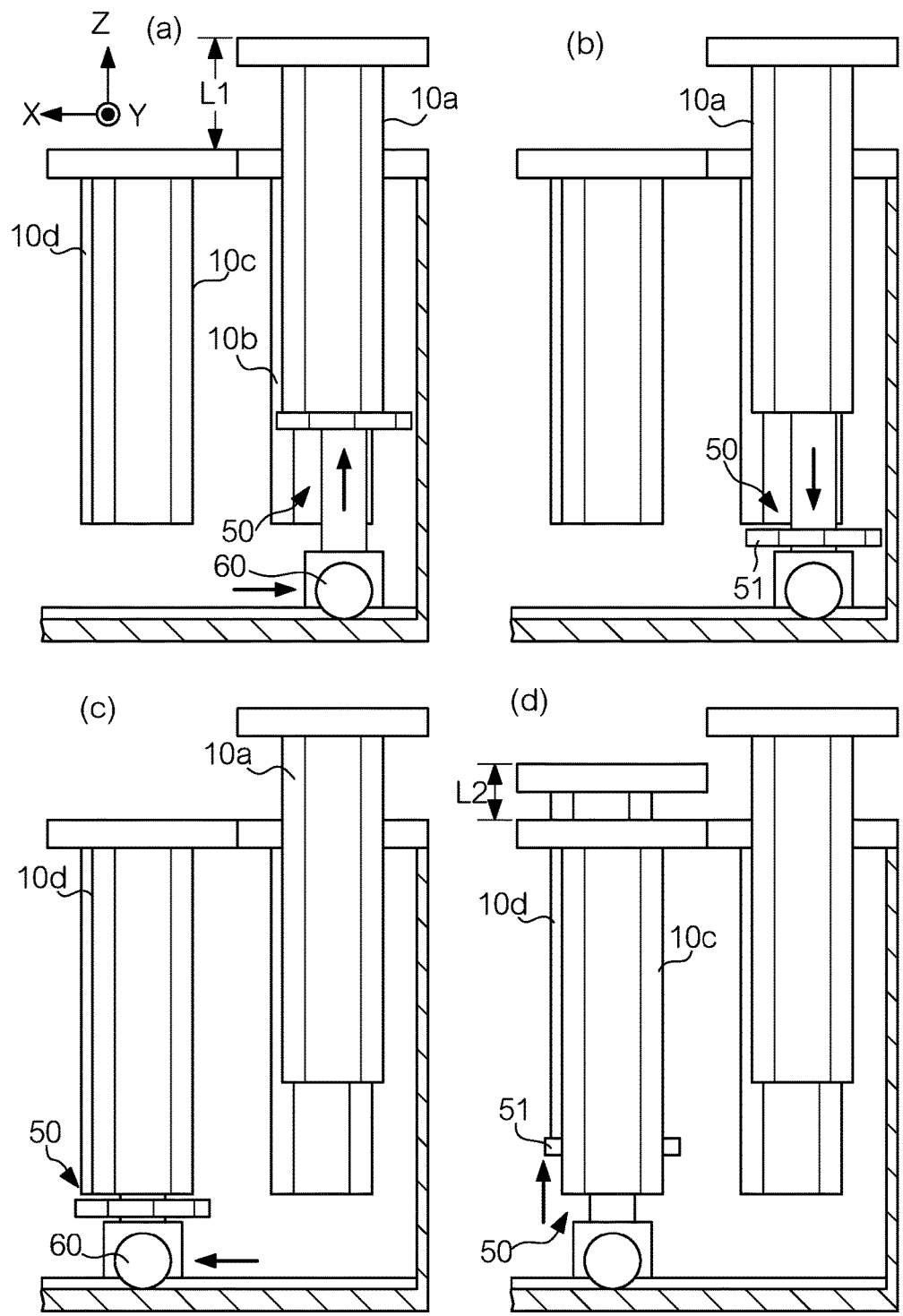
FIG. 7 is a diagram explaining a procedure for fixing a position in the vertical direction of a holding member.

FIG. 7 is a diagram explaining a procedure for controlling positions in the vertical direction of holding members 10. The drawing shows holding members 10a, 10b, 10c, and 10d, first moving mechanism 50, and second moving mechanism 60, which are viewed in the positive direction of the Y-axis. The drawing omits to show support member 3, vertical direction rail 30, and fixing mechanism 40 for simplicity. Initially, a user may perform an operation relative to instruction unit 70 shown in FIG. 2 to select a corresponding position for holding member 10a, and to determine a vertical position represented by length L1 for the holding member. In response to the operation, second moving mechanism 60, under control of instruction unit 70, moves first moving mechanism 50 to the corresponding position for holding member 10a, and first moving mechanism 50, under control of instruction unit 70, moves holding member 10a upward to the vertical position by length L1, as shown in FIG. 7(a).

Subsequently, the user may operate first fixing part 41 to temporarily fix the position shown in FIG. 7(a) of holding member 10a, and may perform an operation relative to instruction unit 70 to select a corresponding position for holding member 10d, and to determine a vertical position represented by length L2 for the holding member. In response to the operation, first moving mechanism 50, under control of instruction unit 70, moves member 51 to a position lower than those of all holding members 10, as shown in FIG. 7(b), and thereafter second moving mechanism 60, under control of instruction unit 70, moves first moving mechanism 50 to the corresponding position for holding member 10d, as shown in FIG. 7(c). Subsequently, first moving mechanism 50, under control of instruction unit 70, by moving member 51 upward, moves holding member 10a upward to the vertical position by length L2, as shown in FIG. 7(d).

Control unit 100, as described in the foregoing, controls positions in the vertical direction of holding members 10 by causing second moving mechanism 60 to move first moving mechanism 50 to a corresponding position for holding member 10, and by causing first moving mechanism 50 to move holding members 10 in the vertical direction. This procedure enables a single mechanism (first moving mechanism 50) for moving holding members 10 in the vertical direction to move holding members 10 in the vertical direction.

Subsequently, the user may repeatedly perform an operation to select a corresponding position and to determine a vertical position for holding member 10, and cause first fixing part 41 to temporarily fix the holding member until holding members 10 are temporarily fixed to vertical positions determined by the user for holding an object to be processed. After vertical positions of holding members 10 are temporarily fixed, the user may perform an operation relative to instruction unit 70 to activate fixture by second fixing part 42. In response to the operation, second fixing part 42, under control of instruction unit 70, fixes the vertical positions of holding members 10.

Figure 8:
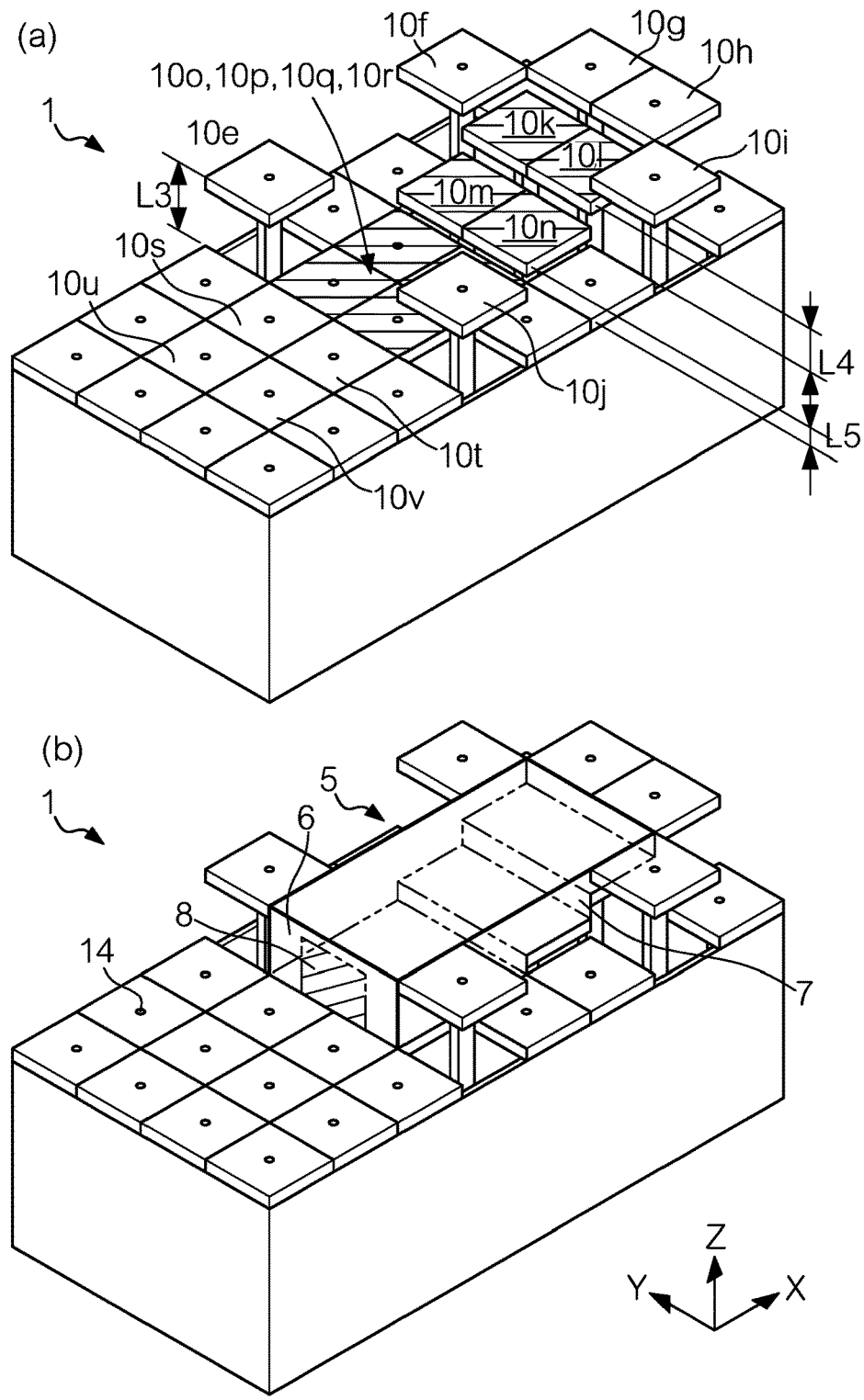
FIG. 8 is a diagram showing an example of controlled positions in the vertical direction of holding members.

FIG. 8 is a diagram showing an example of controlled positions in the vertical direction of holding members 10. FIG. 8(a) shows six holding members 10e to 10j fixed to a vertical position represented by length L3, holding members 10k and 10l fixed to a vertical position represented by length L4, holding members 10m and 10n fixed to a vertical position represented by length L5, and the remaining holding members 10 fixed to a vertical position represented by length 0. The remaining holding members 10 have not been pushed up.

FIG. 8(b) shows jig apparatus 1 shown in FIG. 8(a) on which workpiece 5 is placed. Workpiece 5 includes horizontal parts 6 and 7, which face the horizontal direction when the object is placed on jig apparatus 1. In jig apparatus 1, eight holding members 10k, 10l, 10m, 10n, 10o, 10p, 10q, and 10r form steps conforming to a shape of the underside of workpiece 5. Mount parts 11 of eight holding members 10 come into contact with the underside of workpiece 5. FIG. 8(a) visually distinguishes mount parts 11 of eight holding members 10 by hatching. Eight holding members 10 are first holding members described above, which are holding members 10 selected as holding members on which an object to be processed is placed. Mount parts 11 of eight holding members 10 come into contact with the underside of the object.

In jig apparatus 1 shown in FIG. 8, six holding members 10e to 10j are selected as second holding members from among holding members 10 around the first holding members, and are caused to move to specified vertical positions. In the situation shown in FIG. 8(b), horizontal contact parts 12 of the second holding members come into contact with a horizontal part of workpiece 5 so that the second holding members receive a force in the horizontal direction exerted by workpiece 5 being processed. As a result, the position in the horizontal direction of workpiece 5 is fixed. Control unit 100, as described in the foregoing, causes the second holding members to be moved in the vertical direction to specified positions, and causes the first and second holding members to cooperate in holding workpiece 5. The second holding members hold the object at the specified positions, which may be determined depending on the shape, size, and position of the object.

Control unit 100, specifically, causes horizontal contact parts 12 of the second holding members to come into contact with a horizontal part of workpiece 5 placed on mount parts 11 of the first holding members, so that the second holding members hold the object. It is to be noted that mount parts 11 of holding members 10k, 10l, 10m, and 10n come into contact with the underside of the object, while horizontal contact parts 12 of the holding members come into contact with a horizontal part of the object. Control unit 100 may cause a holding member 10 to serve as first and second holding members depending on a shape and size of an object to be processed. For example, control unit 100, when assumed that holding members 10m and 10n are first holding members, causes holding members 10k and 10l as second holding members, to move in the vertical direction. When assumed that holding members 10k and 10l are first holding members, control unit 100 causes holding members 10f and 10g, 10h, and 10i, as second holding members, to move in the vertical direction.

In jig apparatus 1 shown in FIG. 8, process part 8 indicated by hatching in FIG. 8(b), included in horizontal part 6 of workpiece 5 is to be processed. The term "process part" herein refers to a part of an object to be processed, that is to be processed. In jig apparatus 1 shown in FIG. 8, holding members 10s, 10t, 10u, and 10v exist in front of process part 8 as holding members 10 around the first holding members. In other words, holding members 10s, 10t, 10u, and 10v exist at the negative direction side of the X-axis of process part 8. Holding members 10u and 10v are not adjacent to the first holding members; in other words, they are separated from the first holding members by another holding member. Holding members 10s, 10t, 10u, and 10v have not been moved upward since they have not been selected as second holding members.

Accordingly, process part 8 is exposed, without being covered by holding members 10 so that holding members 10 do not hinder, for example, processing of process part 8 using a processing machine or tool. If all holding members 10 around the first holding members come into contact with a horizontal part of workpiece 5, the holding members can hinder processing of process part 8 included in the horizontal part. Control unit 100 according to the present embodiment causes only holding members 10 selected as second holding members from among holding members 10 around the first holding members to move in the vertical direction so that holding members 10 do not hinder processing of a horizontal part of the object.

Upper holding member 20 described above may be attached to holding members 10 shown in FIG. 8(b) to hold the upper side of workpiece 5.

Figure 9:
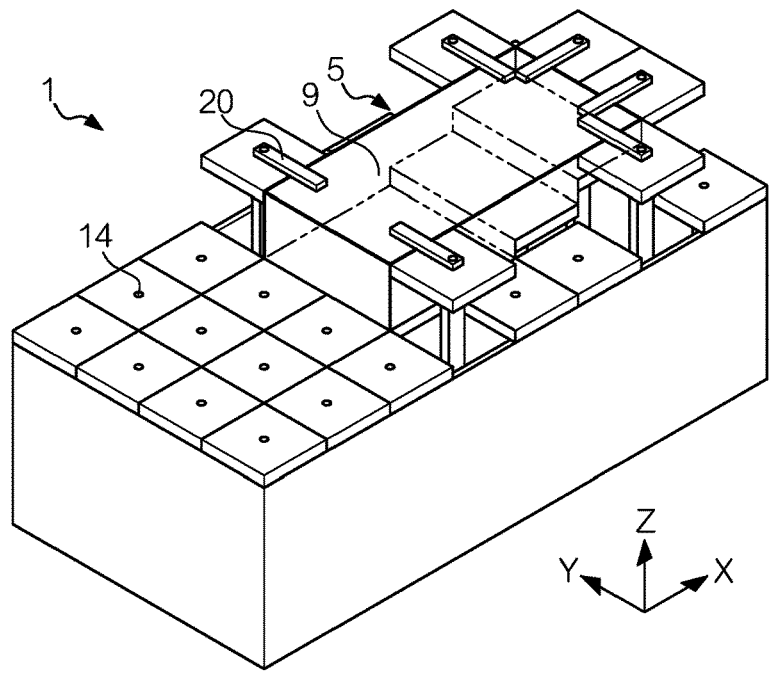
FIG. 9 is a diagram showing an example of holding members to which an upper holding member is attached.

FIG. 9 shows an example of holding members 10 to which upper holding member 20 is attached. The drawing shows six holding members 10e to 10j shown in FIG. 8, to attach parts 14 of which upper holding member 20 is attached, which member comes into contact with upper part 9 of workpiece 5. Upper holding member 20 prevents workpiece 5 being processed from moving in the upper direction.

Upper holding member 20, in a case where a process part is included in upper part 9, may be attached so that the upper holding member does not come into contact with the process part. In another case where a space can exist between an object to be processed and horizontal contact part 12 depending on the shape and size of the object, upper holding member 20 attached to a second holding member may hold the upper side of the object. Namely, the second holding member holds the object being processed to prevent the object from moving in the horizontal direction, by receiving a force in the horizontal direction exerted by the object, using a force of friction between upper holding member 20 and the object. The second holding member holds the object not at a position where horizontal contact part 12 of the second holding member comes into contact with the object, but at a position where the second holding member receives the force in the horizontal direction exerted by the object via upper holding member 20. The second holding member may not come into contact with the object at the position where the second holding member holds the object.

In the same case, holding members 10 may hold an object to be processed, using square member 15 that is positioned nearer the object than holding members 10 to which upper holding member 20 is attached.

Figure 10:
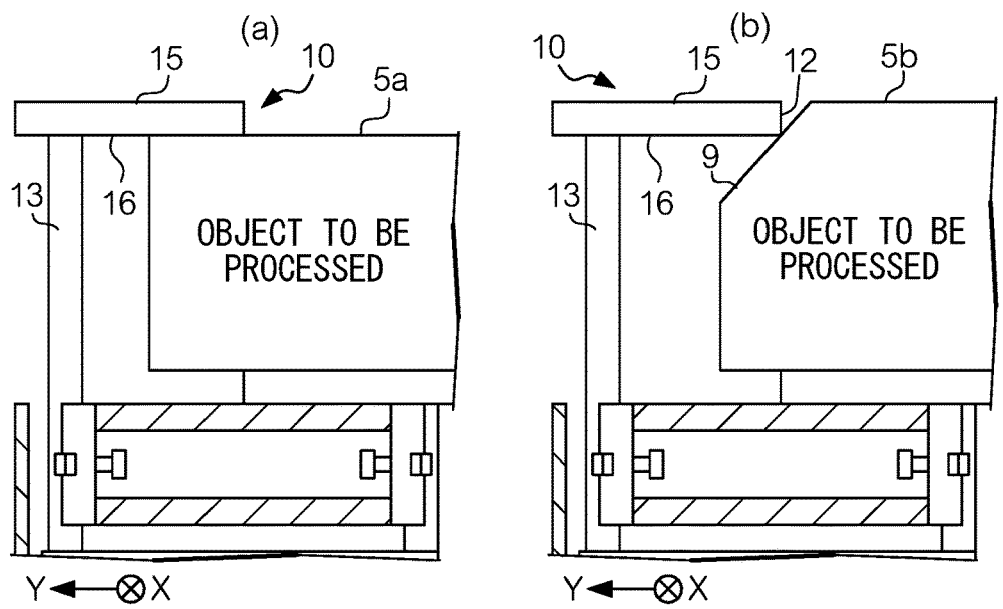
FIG. 10 is a diagram showing holding member 10 viewed in the X-axis direction.

FIG. 10 is a diagram showing holding member 10 viewed in the X-axis direction. FIG. 10(a) shows square member 15 whose underside 16 comes into contact with workpiece 5a so that the square member holds the object. Holding member 10 having square member 15 holds the object being processed, by receiving a force in the horizontal direction exerted by the object, using a force of friction between underside 16 and the object. Namely, the holding member serves as a second holding member.

FIG. 10(b) shows workpiece 5b whose upper corner edge is chamfered to form slope 9. A second holding member may hold the object by causing an edge formed by horizontal contact part 12 and underside 16 to come into contact with slope 9 of the object, as shown in the drawing. In both cases shown in FIGS. 10(a) and 10(b), a second holding member holds an object to be processed, under a first member (square member 15) of the second holding member. This holding method is possible because a second holding member comes into contact with an object to be processed, at a position nearer the object than a second member (moving rail 13). The positional relationship between a contact part and moving rail 13 of a second holding member may be established relative to holding member 10 viewed in the Y-axis direction.

Workpiece 5 shown in FIG. 9 has a size in the X-axis direction that is integral multiple (quadruple) of a size in the X-axis direction of mount part 11, and has a size in the Y-axis direction that is integral multiple (double) of a size in the Y-axis direction of the mount part; accordingly, a second holding member can hold the object by causing horizontal contact part 12 to come into contact with the object. In contrast, workpiece 5a and 9b shown in FIG. 10 have a size in the Y-axis that is not integral multiple of a size in the Y-axis of mount part 11; accordingly, a second holding member can hold the objects under square member 15.

The positional relationship between a contact part and moving rail 13 of a second holding member, illustrated in the foregoing, makes it possible to hold an object to be processed, which has different sizes, in contrast to a case where a contact member of a second holding members is not positioned nearer an object to be processed in the horizontal direction than moving rail 13. Whether contact part and moving rail 13 of a second holding member has the above positional relationship, the present embodiment makes it possible to hold objects to be processed, having different shapes, in such a manner as to facilitate processing of the object, by first and second holding members selected according to the shape and size of the object.

[2] Modifications

The above embodiment is one of embodiments of the present invention. The above embodiment may be modified as described below. The above embodiment and the following modifications may be combined with each other.

[2-1] First Fixing Part

The first fixing part according to the above embodiment may fix moving rail 13 in another method. For example, the first fixing part may, instead of fixing moving rail 13 using a magnet, fix the moving rail by inserting a bar-shaped member into one of holes arranged at the moving rail in the vertical direction. Alternatively, the first fixing part may fix moving rail 13 by clamping the moving rail as a vise does. In essence, the first fixing part may be any part that can temporarily fix a position in the vertical direction of moving rail 13. In another example, the first fixing part may temporarily fix moving rail 13 according to an instruction provided from instruction unit 70, not in response to a user's manual operation of hinge 412. For example, first fixing part 41 according to the above embodiment may temporarily fix a position in the vertical direction of moving rail 13 using a driving part including a motor, that moves hinge 412 according to an instruction provided from instruction unit 70. This modification example enables a user to move holding members 10 to specified vertical positions only by operating instruction unit 70.

[2-2] Second Fixing Part

The second fixing part may fix moving rail 13 in another method. For example, pushing part 422 may be operated manually by a user. Alternatively, holding members 10 may be individually fixed using a driving part provided at each of the holding members. In essence, the second fixing part may be any part that can fix a position in the vertical direction of moving rail 13 during processing.

[2-3] Control using Information Indicative of a Vertical Position

Control unit 100 according to the above embodiment may perform control based on information other than a user's operation.

Figure 11:
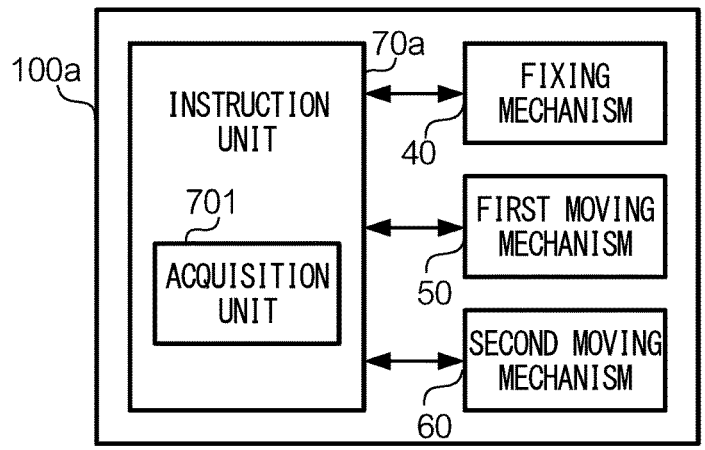
FIG. 11 is a block diagram showing a hardware configuration of a control unit according to a modification.

FIG. 11 is a diagram showing an example of a hardware configuration of a control unit according to the present modification. The drawing shows instruction unit 70a including acquisition unit 701, and control unit 100a including instruction unit 70a. Acquisition unit 701 acquires information indicative of positions in the vertical direction (or vertical positions) of one or more second holding members. The information will hereinafter be referred to as "position information." Position information corresponds to the shape of an object to be processed.

Position information includes, for example, an ID (for example, an identifier represented by a value, a symbol, or a combination of them, such as 10a or 10b) assigned to holding member 10, and a value (for example, represented by a length by which holding member 10 is pushed up) indicative of a vertical position associated with the ID. In an example, position information "10e, L3" indicates that a vertical position of holding member 10e shown in FIG. 8 is length L3. Acquisition unit 701 acquires position information from storage unit 72, which indicates vertical positions of second holding members (and first holding members) determined by a user operating instruction input unit 74 shown in FIG. 4. Alternatively, acquisition unit 701 may acquire position information sent from an external device if interface 73 is connected to the external device.

Instruction unit 70a instructs first moving mechanism 50 and second moving mechanism 60 to move holding members 10 indicated by position information acquired by acquisition unit 701 to vertical positions indicated by the position information. Namely, control unit 100a, based on position information acquired by acquisition unit 701, causes one or more second holding members to be moved to vertical positions indicated by the position information. This modification example enables a user to use vertical positions determined for an object to be processed, which has been used in the past and recorded. The modification example also enables a user to use vertical positions at a jig apparatus, which has been determined at another jig apparatus, through exchange of position information.

[2-4] First Moving Mechanism

The first moving mechanism according to the above embodiment may move holding members 10 in another method. For example, the first moving mechanism may move holding members 10 in the vertical direction by means of a moving member having a different shape from member 51. When doing so, the first moving mechanism may include a moving member, only one edge of which has protruding parts and a depressed part, and a rotary drive part for rotating the moving member, and cause the rotary drive part to rotate the moving member to move holding members 10 included in a first or second holding member group. Alternatively, the first moving mechanism may move holding members 10 using a bar-shaped moving member, instead of H-shaped member 51. Alternatively, the first moving mechanism may move two or more holding members 10 simultaneously.

Alternatively, the first moving mechanism may move holding members 10 hydraulically or pneumatically, instead of using a motor. In essence, the first moving mechanism may be any mechanism that can move one or more holding members 10 in the vertical direction.

[2-5] Second Moving Mechanism

The second moving mechanism according to the above embodiment may move the first moving mechanism in another method. For example, the second moving mechanism may include an endless belt provided along a holding member group, to which the first moving mechanism is fixed, and a rotary drive part for rotating the belt, and cause the rotary drive part to rotate the belt to move the first moving mechanism. Alternatively, the second moving mechanism may not move the first moving mechanism along a holding member group. For example, the second moving mechanism may move the first moving mechanism, which is configured to push up the bottom of holding member 10, between different holding member groups. Specifically, the second moving mechanism, in a situation where holding members 10 are arranged as in the case of the jig apparatus shown in FIG. 1, may move the first moving mechanism from a position beneath holding member group 110 in the negative direction of the Y-axis to a position beneath holding member group 140, move the first moving mechanism in the positive direction of the X-axis to a position directly beneath an adjacent holding member 10, and move the first moving mechanism in the positive direction of the Y-axis to a position beneath holding member group 110. In essence, the second moving mechanism may be any mechanism that can move the first moving mechanism to a corresponding position.

[2-6] Holding Member

A holding member according to the above embodiment may have another shape. For example, a mount part and a horizontal contact part may be a rounded or uneven surface, not a flat surface. Alternatively, a material such as a rubber may be attached to a mount part and a horizontal contact part. Alternatively, a mount part may have a rectangular, triangular, or circular shape, not a square shape. A horizontal contact part may have a square, triangular, or circular shape, not a rectangular shape. In essence, a holding member may be any member that are arranged two-dimensionally, and comes into contact with and hold an object to be processed to prevent the object from moving.

Figure 12:
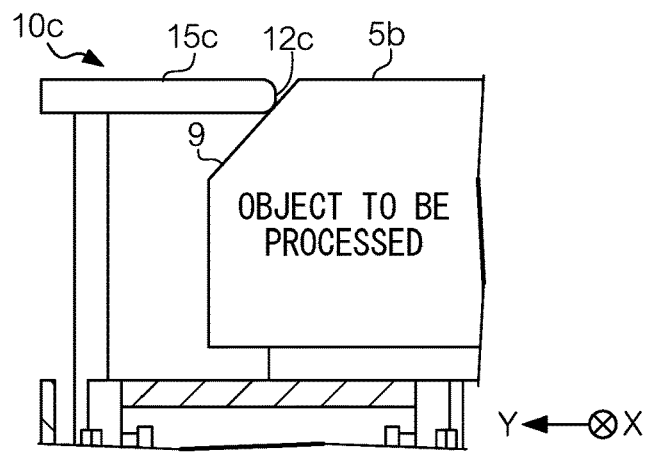
FIG. 12 is a diagram showing a holding member according to a modification, viewed in the X-axis direction.

FIG. 12 is a diagram showing holding member 10c according to the present modification, viewed in the direction of the X-axis. Holding member 10c is selected as a second holding member. Horizontal contact part 12c of square member 15c comes into contact with slope 9 of workpiece 5 shown in FIG. 10(b). The contact part (horizontal contact part 12c) of the second holding member, which comes into contact with the object, has a rounded shape so that the contact part is less likely to damage the object as compared to a pointed contact part. Alternatively, the contact part may be elastic so that it is less likely to damage the object.

A contact part of a second holding member, which comes into contact with an object to be processed, may be movable in the horizontal direction. Such a contact part is shown in FIGS. 13 and 14.

Figure 13:
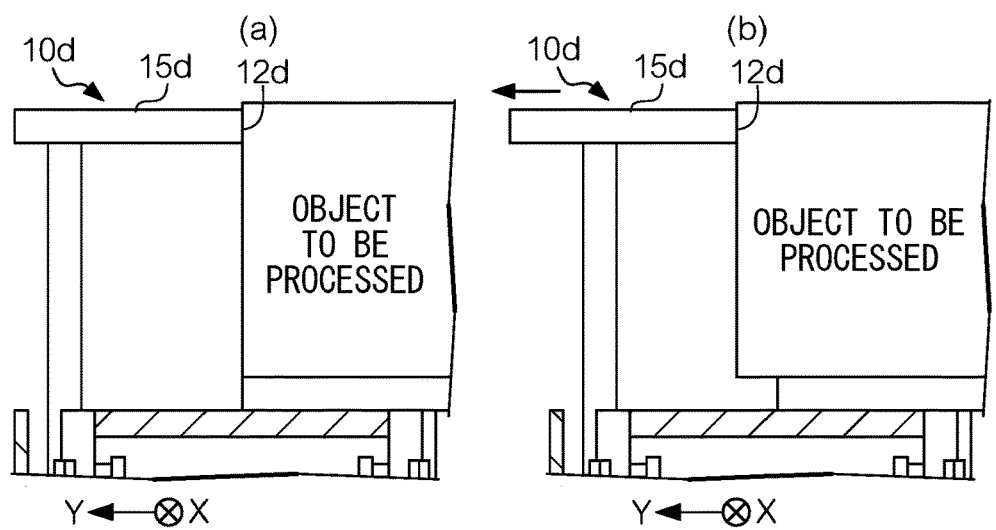
FIG. 13 is a diagram showing a holding member according to a modification, viewed in the X-axis direction.

FIG. 13 is a diagram showing holding member 10d according to the present modification, viewed in the X-axis direction. Square member 15d of holding member 10d is supported so that the square member can move in the horizontal direction from a position shown in FIG. 8, at which the square member comes into contact with and holds workpiece 5, as shown in FIG. 13(*a*). With the arrangement, a contact part is movable in the horizontal direction. Accordingly, horizontal contact part 12*d* can hold workpiece 5*d*, which is larger in the Y-axis direction than workpiece 5, as shown in FIG. 13(*b*).

Figure 14:
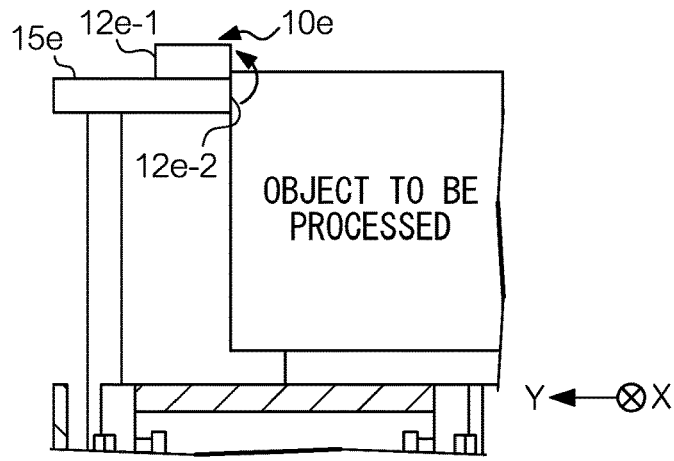
FIG. 14 is a diagram showing a holding member according to a modification, viewed in the X-axis direction.

FIG. 14 is a diagram showing holding member 10*e* according to the present modification, viewed in the X-axis direction. Square member 15*e* of holding member 10*e* can be folded at a certain point in the Y-axis direction, as shown in the drawing. Unfolded square member 15*e* includes horizontal contact part 12*e*-1, while folded square member 15*e* includes horizontal contact part 12*e*-2. With the structure, a contact part is movable in the horizontal direction. Accordingly, horizontal contact part 12*e*-2 can hold workpiece 5*d*, which is larger in the Y-axis direction than workpiece 5, as in the case of holding member 10*d* shown in FIG. 13.

A holding member may include a protruding member that can protrude in the horizontal direction from a horizontal part, and maintain the position in the horizontal direction. The holding member, in a case where a space exists between an object to be processed and the horizontal part, may cause the protruding member to protrude so that the protruding member comes into contact with the object, and to maintain the position of the protruding member to prevent the object from moving in the horizontal direction.

Holding members according to the embodiment, which are caused to move in the vertical direction, which is a direction perpendicular to mount part 11 arranged parallel to the horizontal plane, may be caused to move in a direction forming an angle with the horizontal plane, as the vertical direction. The holding members that are caused to move in a direction forming an angle with the horizontal plane, if second holding members are appropriately selected, do not hinder processing of a process part, as in the case of the above embodiment.

A holding member may have a horizontal contact part that is elongated in the downward direction.

Figure 15:
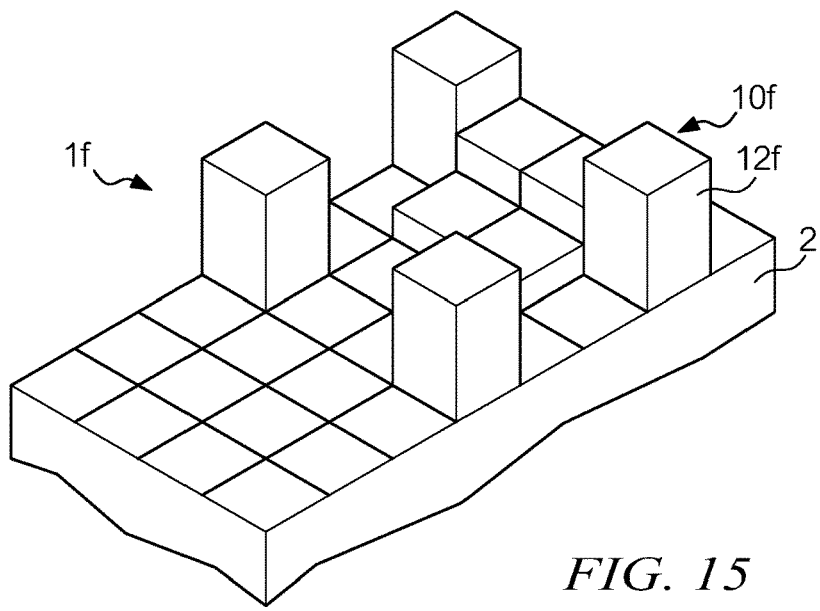
FIG. 15 is a diagram showing an appearance of a jig apparatus according to a modification.

FIG. 15 is a diagram showing an appearance of jig apparatus if according to the present modification. Holding members 10*f* of jig apparatus if include horizontal contact part 12*f*, a part of which is covered by housing 2 in a condition that the holding member is at the highest position. Horizontal contact part 12*f* receives a force in the horizontal direction exerted by an object to be processed. Holding member 10*f* including horizontal contact part 12*f* can receive a larger force in the horizontal direction than a case where only a rail member receives a force as in the case of the above embodiment.

First members (square members 15) according to the above embodiment, which are arranged so that they form a grid pattern, may be arranged in a different manner. For example, hexagonal-shaped first members may be tightly arranged.

Figure 16:
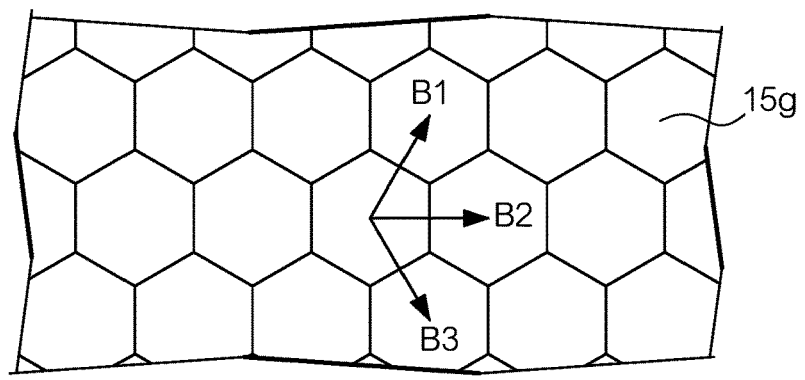
FIG. 16 is a diagram showing first members according to a modification, viewed from above.

FIG. 16 is a diagram showing first members 15*g* according to the present modification, viewed from above. First members 15*g* are arranged in a row along each of three directions B1, B2, and B3. Directions B1 and B2 form an angle of 60 degrees, and directions B2 and B3 form the same angle. When first members 15*g* are thus arranged, holding members are arranged two-dimensionally. First members 15*g* thus arranged can hold objects to be processed, having different shapes, in such a manner as to facilitate processing of the object, as in the case of the above embodiment.

[2-7] Upper Holding Member

An upper holding member according to the above embodiment may have a different shape and size depending on a shape, a size, and a material of an object to be processed. Two or more upper holding members may be attached to each of holding members in contrast to the above embodiment where an upper holding member is attached to each of holding members. Upper holding member having different shapes or sizes may be attached to holding members. In essence, an upper holding member may be any member that can be attached to a holding member, and can hold the upper side of an object to be processed.

The invention claimed is:

1. A jig apparatus comprising:
   one or more first holding members selected from among plural holding members supported so that the plural holding members are able to move in a vertical direction, an object to be processed being placed on the one or more first holding members;
   one or more second holding members selected from among the plural holding members, the one or more second holding members holding the object being processed, by receiving a force in a horizontal direction exerted by the object; and
   a control unit that moves the one or more second holding members in the vertical direction to a position where the one or more second holding members hold the object, wherein the control unit comprises:
   a first mechanism that moves the one or more second holding members in the vertical direction; and
   a second mechanism that moves the first mechanism in the horizontal direction,
   wherein the plural holding members are arranged two-dimensionally, and
   wherein the control unit, in response to movement in the vertical direction of one or more holding members belonging to a row of holding members, prevents a holding member belonging to another row of holding members from moving in the vertical direction.

2. The jig apparatus according to claim 1, wherein the plural holding members comprises an attach part, a member for holding an upper side of the object being attached to the attach part.

3. The jig apparatus according to claim 1, further comprising an acquiring unit that acquires information indicative of positions in the vertical direction of the one or more second holding members, the positions corresponding to a shape of the object, wherein the control unit moves the one or more second holding members based on the information.

4. The jig apparatus according to claim 1, wherein:
   the plural holding members comprise a first member comprising a contact part that comes into contact with the object, and a second member that supports an underside of the first member; and
   a contact member of the one or more second holding members is positioned nearer the object in the horizontal direction than the second member of the plural holding members.

5. The jig apparatus according to claim 4, wherein the contact member of the one or more second holding members is movable in the horizontal direction.

6. The jig apparatus according to claim 4, wherein the contact member of the one or more second holding members has a rounded shape or is elastic.

7. The jig apparatus according to claim 1, wherein:
   the first mechanism comprises a plate-shaped member that is caused by a driving part to move in the vertical direction so that the plate-shaped member pushes up one of the first or second holding members, the plate-shaped member comprises a first protruding part and a first depressed part, which are parts formed at one end of the plate-shaped member, and a second protruding part and a second protruding part, which are parts formed at another end of the plate-shaped member, when the first mechanism moves one of the first or second holding members belonging to a row of holding members, the first protruding part comes into contact with the one of the first or second holding members so that the first protruding part pushes up the one of the first or second holding members, and the second depressed part overlaps another one of the first or second holding members belonging to another row of holding members so that the second depressed part does not push up the other one of the first or second holding members, and when the first mechanism moves the other one of the first or second holding members, the second protruding part comes into contact with the other one of the first or second holding members so that the second protruding part pushes up the other one of the first or second holding members, and the first depressed part overlaps the one of the first or second holding members so that the first depressed part does not push up the one of the first or second holding members.

* * * * *